(12) United States Patent
Yamamuro et al.

(10) Patent No.: US 10,113,088 B2
(45) Date of Patent: *Oct. 30, 2018

(54) LABEL MANUFACTURING METHOD AND LABEL

(71) Applicant: Sato Holdings Kabushiki Kaisha, Tokyo (JP)

(72) Inventors: Hiromi Yamamuro, Tokyo (JP); Yoshihito Fujii, Tokyo (JP)

(73) Assignee: SATO HOLDINGS KABUSHIKI KAISHA (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,915

(22) Filed: Dec. 29, 2016

(65) Prior Publication Data

US 2017/0174948 A1    Jun. 22, 2017

Related U.S. Application Data

(63) Continuation of application No. 14/113,369, filed as application No. PCT/JP2012/002903 on Apr. 27, 2012, now Pat. No. 9,567,495.

(30) Foreign Application Priority Data

Apr. 28, 2011    (JP) .................................. 2011-100596

(51) Int. Cl.
*C09J 5/00* (2006.01)
*C09J 7/02* (2006.01)
(Continued)

(52) U.S. Cl.
CPC ............ *C09J 7/0228* (2013.01); *B31D 1/021* (2013.01); *B31D 1/026* (2013.01); *C09J 7/38* (2018.01);
(Continued)

(58) Field of Classification Search
CPC ............. C09J 7/02; B31D 1/026; B31D 1/021
See application file for complete search history.

(56) References Cited

U.S. PATENT DOCUMENTS 5,416,127 A * 5/1995 Chandran ............. C08F 299/00
522/149
6,187,432 B1 * 2/2001 Krish ..................... C09J 7/0207
428/343

(Continued)

FOREIGN PATENT DOCUMENTS

JP    7-104669    4/1995
JP    7-39062     5/1995
(Continued)

OTHER PUBLICATIONS

International Search Report dated Aug. 7, 2012 issued in corresponding International patent application No. PCT/JP2012/002903.
(Continued)

*Primary Examiner* — Xiao S Zhao
(74) *Attorney, Agent, or Firm* — Ostrolenk Faber LLP (57) ABSTRACT

A label manufacturing method including: applying an adhesive to a base sheet to form an adhesive layer; applying an acrylate-based bonding adhesive to part of the adhesive layer to cure the adhesive layer so as to form a cured portion; and cutting the cured portion to define labels. A label having an adhesive layer 12 laminated on a base sheet 13. A part of the adhesive layer 12 is cured to form a cured portion 14, wherein the cured portion 14 is cured by an acrylate-based bonding adhesive for enabling cutting labels off the laminated base sheet.

11 Claims, 8 Drawing Sheets

(51) Int. Cl.
  *G09F 3/10* (2006.01)
  *B31D 1/02* (2006.01)
  *C09J 7/38* (2018.01)

(52) U.S. Cl.
  CPC ........... *G09F 3/10* (2013.01); *C09J 2203/334* (2013.01); *C09J 2205/31* (2013.01); *C09J 2421/005* (2013.01); *C09J 2433/005* (2013.01); *C09J 2467/006* (2013.01); *Y10T 428/2891* (2015.01)

(56) References Cited

U.S. PATENT DOCUMENTS

| | | | |
|---|---|---|---|
| 6,357,503 B1 | 3/2002 | Kromer et al. | 156/351 |
| 2008/0251194 A1 | 10/2008 | Moeller et al. | 156/275.3 |

FOREIGN PATENT DOCUMENTS

| | | |
|---|---|---|
| JP | 11-179820 | 7/1999 |
| JP | 2000-177031 | 6/2000 |
| JP | 2000-239621 | 9/2000 |
| JP | 2002-294177 | 10/2002 |
| JP | 2003-271063 | 9/2003 |
| JP | 2005-156941 | 6/2005 |
| JP | 2005-321422 | 11/2005 |
| JP | 2005321422 A * | 11/2005 ............... G09F 3/02 |

OTHER PUBLICATIONS

Chinese Office Action dated Aug. 20, 2014, issued in corresponding Chinese Patent Application No. 201280020788.1. English Translation of Search Report. Total 8 pages.
Office Action dated Aug. 20, 2014 issued in corresponding Chinese Patent Application No. 2012800207881 with English translation.
Second Office Action dated Apr. 22, 2015 issued in corresponding Chinese Patent Application No. 201280020788.1 with English translation.
Extended European Search Report dated Nov. 27, 2014 in corresponding Application No. 12776908.1.

* cited by examiner

PRIOR ART

FIGURE 7

PRIOR ART

FIGURE 8

PRIOR ART

LABEL MANUFACTURING METHOD AND LABEL

CROSS REFERENCE TO RELATED APPLICATIONS

The present application is a continuation of U.S. patent application Ser. No. 14/113,369, filed Oct. 22, 2013, which is a 35 U.S.C. § 371 national phase conversion of PCT/JP2012/002903, filed Apr. 27, 2012, which in turn claims priority of Japanese Patent Application No. 2011-100596, filed Apr. 28, 2011, the contents of which are incorporated by reference herein. The PCT International Application was published in the Japanese language.

TECHNICAL FIELD

The present invention relates to a label manufacturing method and a label.

BACKGROUND ART

Figure 6:
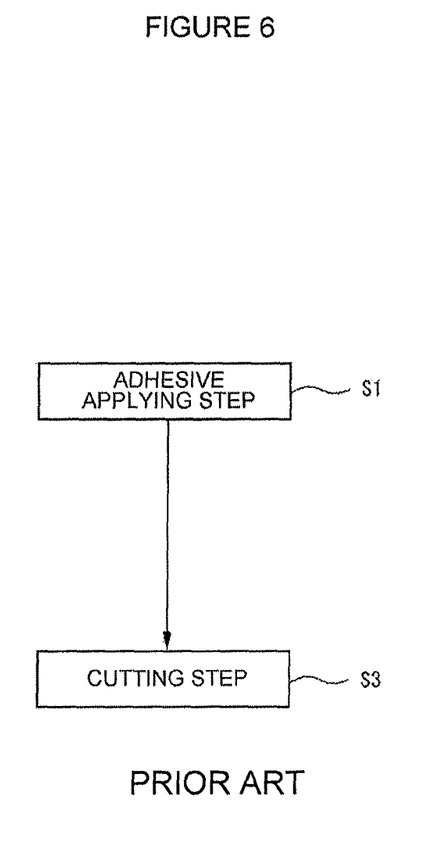
FIG. 6 is a flow chart of a conventional technique.
Figure 7:
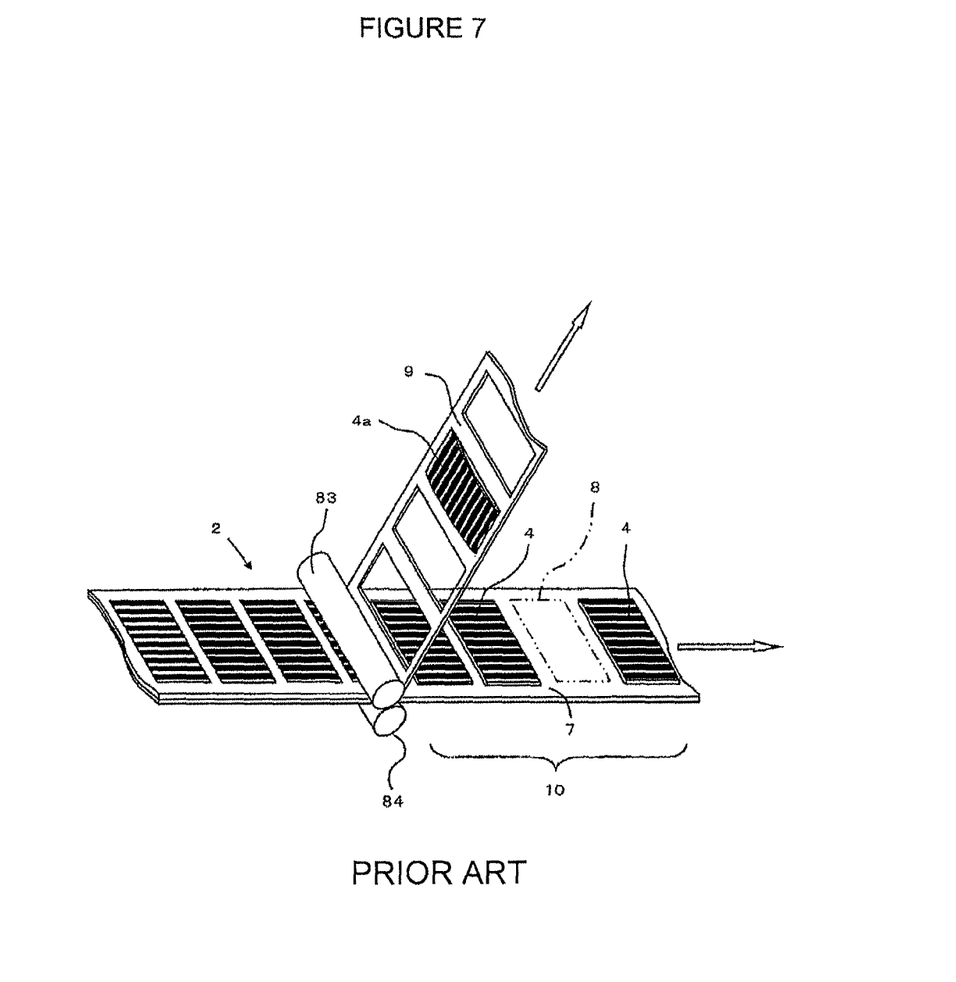
FIG. 7 is a perspective view showing the label lift-up.
Figure 8:
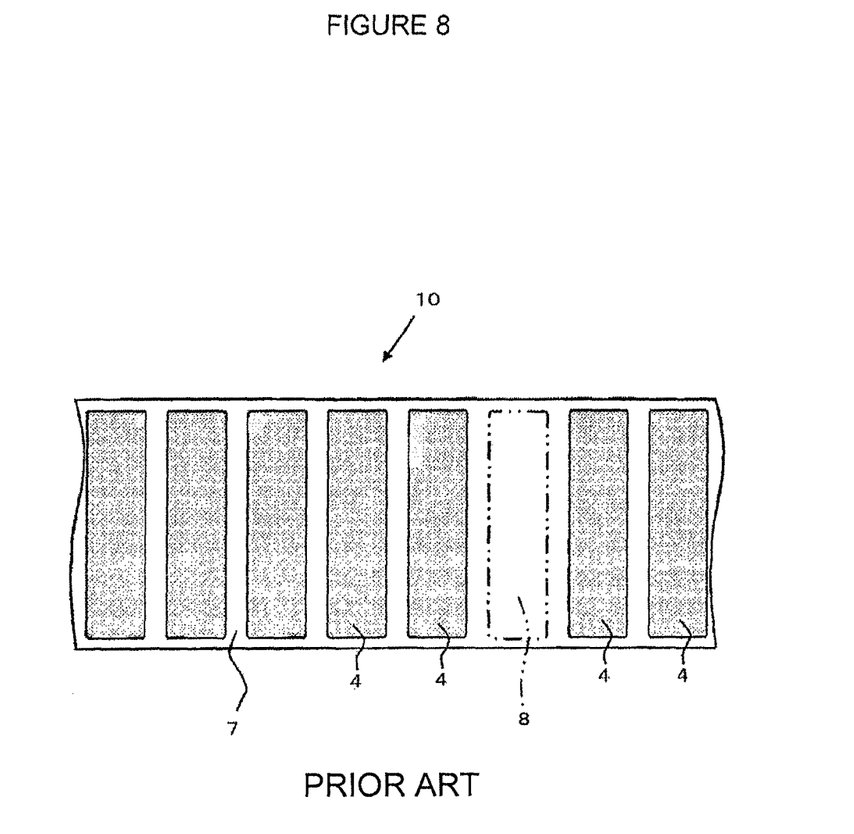
FIG. 8 is a plan view showing the label lift-up.

A conventional method of cutting out label seals into a predetermined shape is known (see Japanese Utility Model Laid-Open No. 7-39062, for example). An example of the conventional technique is described with reference to FIG. 6 to FIG. 8. FIG. 6 is a flow chart of the conventional technique, FIG. 7 is a perspective view showing a label lift-up, and FIG. 8 is a plan view showing the label lift-up. The reference sign S1 indicates an adhesive applying step and the reference sign S3 indicates a cutting step. The reference sign 2 indicates a continuous label body before waste peel-off (waste removal), the reference sign 4 indicates label pieces, the reference sign 4a indicates a lifted-up label piece, the reference sign 7 indicates a separator, the reference sign 8 indicates a missing part, the reference sign 9 indicates a label waste, the reference sign 10 indicates the continuous label body, and the reference signs 83 and 84 indicate waste peel-off rollers, respectively.

In a conventional method as shown in FIG. 6, after the adhesive applying step S1, an adhesive layer is cut with metal cutting blades or the like in the cutting step S3. However, this method could not attain complete cutting of the adhesive in some cases. Consequently, as shown in FIG. 7, the "label lift-up" was performed, in which the label piece 4a was peeled off together with the label waste 9. In this case, as shown in FIG. 8, the continuous label body 10 had a missing part 8 (indicated by a virtual line) where the label piece 4 was missing, which was called an "omission", and this caused deterioration of the yield rate and impaired the productivity. In addition, this may cause complaints from customers because of a shortage of the label pieces 4.

SUMMARY OF THE INVENTION

Technical Problem

The present invention has been made in order to solve the problems described above. The object of the present invention is to provide a label manufacturing method and a label capable of securely cutting an adhesive.

Solution to the Problem

The present invention solves the aforementioned problems by employing the following solutions.

(1) A label manufacturing method includes: an adhesive applying step of applying an adhesive to a base sheet to form an adhesive layer; a curing step of partially applying an acrylate-based bonding adhesive to the adhesive layer to cure the adhesive layer so as to form a cured portion; and a cutting step of cutting the cured portion. (2) Alternatively, a label manufacturing method including: an adhesive applying step of applying an adhesive to a base sheet to form an adhesive layer; a curing step of partially applying an acrylate-based bonding adhesive to the adhesive layer to cure the adhesive layer so as to form a cured portion; a cutting step of cutting the cured portion; and a waste peeling-off step of removing an unnecessary portion. (3) In the label manufacturing method according to (1) or (2), the acrylate-based bonding adhesive is a radical-polymerizable ultraviolet ray-curable composition. (4) In the label manufacturing method according to (1) or (2), the cured portion has a thickness of 1 µm or more to 30 µm or less. (5) In the label manufacturing method according to (1) or (2), the cured portion is formed on a line to be cut in the cutting step and in a vicinity of the line. (6) In the label manufacturing method according to (1) or (2), the cured portion is formed in a range of 0.1 mm or more to 3 mm or less in width including the line to be cut in the cutting step. (7) A label in which an adhesive layer is laminated on a base sheet and a part of the adhesive layer is cured to form a cured portion, wherein the cured portion is cured by an acrylate-based bonding adhesive. (8) In the label according to (7), the acrylate-based bonding adhesive is a cyanoacrylate-based bonding adhesive.

Advantageous Effects of Invention

According to the present invention, it is possible to provide a label manufacturing method and a label capable of having the adhesive thereon securely cut. It is also possible to provide a label manufacturing method and a label produced by the method and capable of preventing the adhesive from adhering onto cutting blades, and also preventing the adhesive from oozing out from the edge of the label.

DESCRIPTION OF EMBODIMENTS

Hereinafter, the best mode for carrying out the present invention is described with reference to the drawings.

Figure 1:
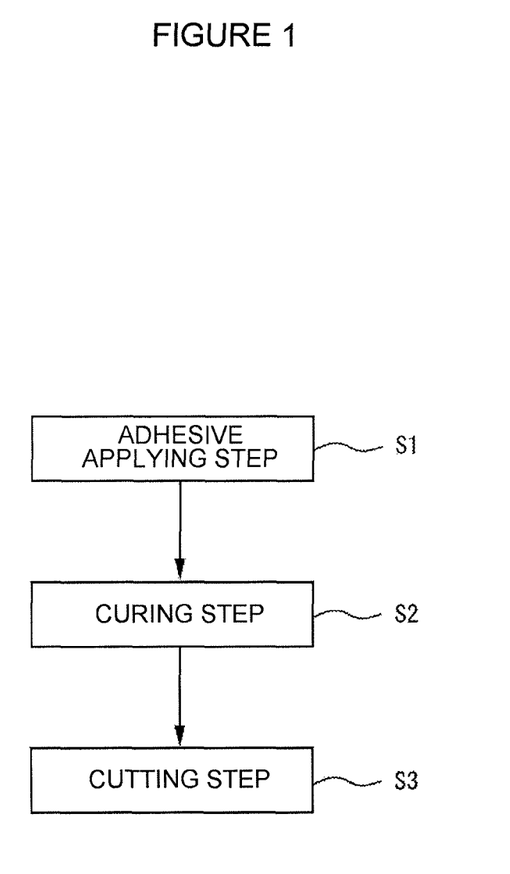
FIG. 1 is a flow chart of the present invention.

FIG. 1 is a flow chart of the present invention. As shown in FIG. 1, the label manufacturing method of the present invention includes an adhesive applying step (S1) of applying adhesive to a base sheet to form an adhesive layer, a curing step (S2) of partially applying an acrylate-based bonding adhesive to the adhesive layer to cure the adhesive layer so as to form a cured portion, and a cutting step (S3) of cutting the cured portion.

After the cutting step, a waste peeling-off step of removing an unnecessary portion may be provided. This curing step allows the adhesive layer to be the cured portion, thereby making the cutting secure. This configuration prevents the label lift-up. In addition, this eliminates causes of deterioration of the yield rate and reduced productivity. Furthermore, because the cutting blades are not brought into contact with the adhesive the adhesive is cured, the adhesive is restrained from adhering to the cutting blades. Deterioration of the cutting blades and stains on the labels due to the adhesive adhered to the cutting blades are also prevented.

The label of the present invention has features including the label has the adhesive layer which is laminated on the base sheet and a part of the adhesive layer is cured to form the cured portion, and the cured portion is cured by the acrylate-based bonding adhesive. Each label is a label piece which is originally attached and is later separated from a label separator, and the labels are generally supplied as a continuous label body in which the labels are continuously attached to the separator.

The type and material of the base sheet are not limited to specific ones, such as paper or a synthetic resin film, and may be ordinary material used as adhesive paper. For example, as the material of the base sheet, paper base materials such as pure paper, coated paper and art paper, a synthetic resin film made of PET (polyethylene terephthalate), PE (polyethylene), PP (polypropylene) or PS (polystyrene), a sheet made of combination of plural types of the above synthetic resins, and a composite sheet made by combining a synthetic resin film and paper, can also be used. Heat-sensitive paper (thermal paper) may also be permissible for use.

The adhesive may be an emulsion type (adhesive dispersed in water), a solvent type (adhesive dissolved in solvent), or a hot melt type (thermoplasticity is utilized) adhesive, etc., for example. As the material quality of the adhesive, an adhesive based on synthetic rubber, natural rubber, an acrylic resin, a polyvinyl ether resin, a urethane resin, or a silicone resin, etc., may be used. The adhesive force of the adhesive may be optionally selected.

A suitable acrylate-based bonding adhesive may be used. One example of the acrylate-based bonding adhesive is an active energy ray-curable type composition mainly containing (meth) acrylate. Examples of the active energy ray include an electron ray, a visible ray, and an ultraviolet ray. The adhesive may be acryl-based, and may also include an additive such as photoinitiator, polymerization inhibitor, thickener, plasticizer, and colorant, etc. It should be noted that, because the acrylate-based bonding adhesive is applied to the adhesive layer and cured, the acrylate-based bonding adhesive used in the present invention may preferably be a radical-polymerizable ultraviolet ray-curable composition which is easy to treat. "Aronix (R) ", which is a trade name for such a bonding adhesive manufactured by Toagosei Co., Ltd., may be used, for example. The acrylate-based bonding adhesive is partially applied on the adhesive layer so that the acrylate-based bonding adhesive permeates the adhesive layer, and cures the layer. A portion where the acrylate-based bonding adhesive and the adhesive are mixed together and cured becomes the cured portion. Cutting of the cured portion with the cutting blades after the curing is preferable because this makes it possible to avoid a disadvantage of cutting the adhesive with the cutting blades. Also, the acrylate-based bonding adhesive may be a cyanoacrylate-based bonding adhesive. For example, "Aron Alpha (R) ", which is a trade name manufactured by Toagosei Co., Ltd., may be used.

The cured portion preferably has a thickness of 1 µm or more to 50 µm or less, and more preferably 10 µm or more to 30 µm or less. The thickness in this range causes preferable influence on the cutting performance. In addition, the cured portion is preferably formed on a line to be cut in the cutting step and in the vicinity of the line. This is because the cutting blades can securely cut the cured portion. This is also because the cured portion is preferably located at an edge of the label piece, thereby preventing the adhesive from oozing out from the label edge. Further, the cured portion located at the edge of the label piece allows the label piece to be easily peeled off from a backing sheet in any direction, which facilitates labeling an object by an automatic labeling machine. It is preferable to form the cured portion within a range of 0.1 mm or more to 3 mm or less in width including the line to be cut in the cutting step. This range prevents the cutting blades from coming into contact with the adhesive, appropriately prevents the adhesive from oozing out, and has no critical influence on the adhesive force of the label. Accordingly, the adhesive can appropriately be prevented from oozing out because the cutting blade does not come into contact with the adhesive. In addition, this range has no critical influence on the adhering function.

The present invention has a feature in that a stronger bonding adhesive is applied and the adhesive is cured to form a cured portion, which is opposite to a conventional concept of using a printing ink or varnish to reduce the adhesive force. It is preferable that the cured portion of the present invention have completely lost its adhesive force.

Figure 2:
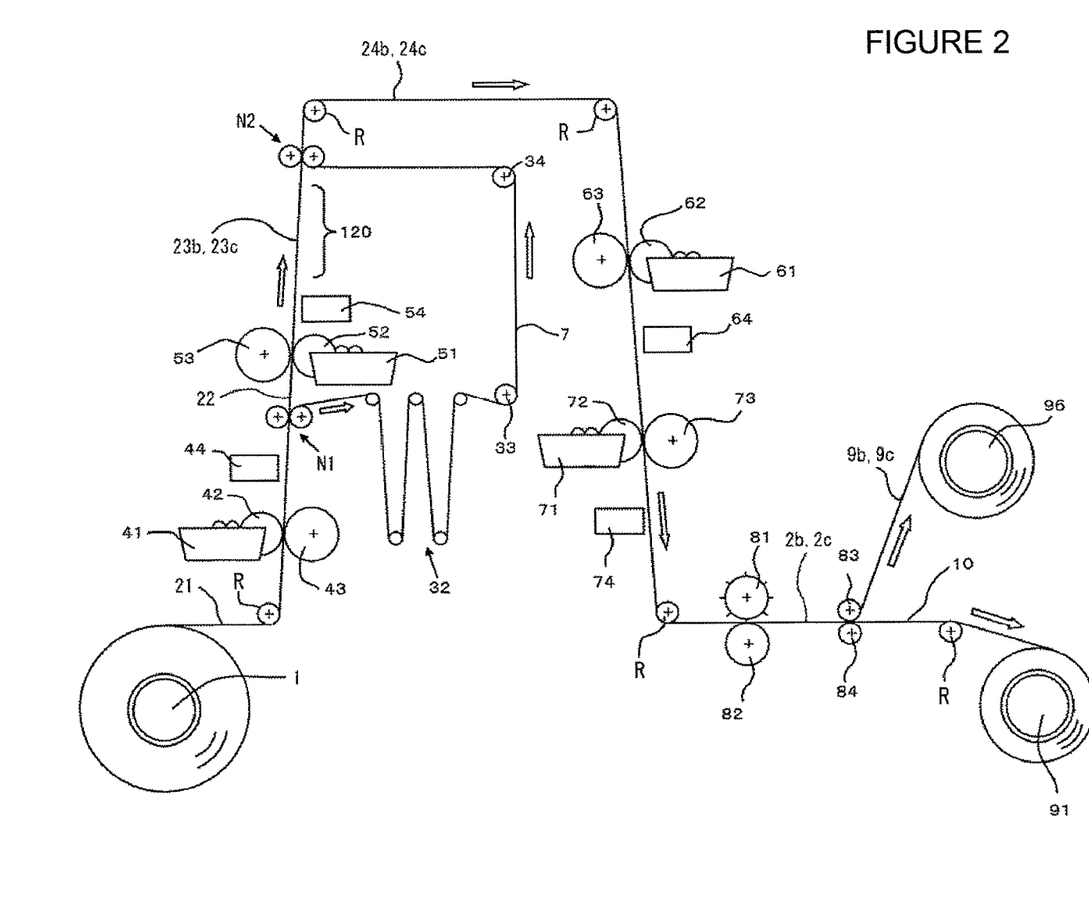
FIG. 2 is a schematic diagram showing a label manufacturing process.
Figure 3A:
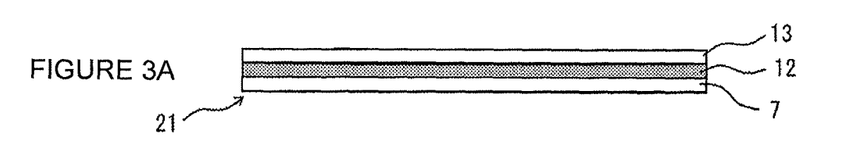
FIGS. 3A-3F are cross sectional views showing a continuous adhesive sheet and a continuous label body according to a first embodiment.

Next, the first embodiment is described with reference to FIG. 2 to FIG. 4. FIG. 2 is a schematic diagram showing the label manufacturing process, FIGS. 3A-3F are a cross sectional views showing the continuous adhesive sheet and the continuous label body according to the first embodiment, and FIG. 4 is a perspective view showing the waste peel-off of the present invention. The reference sign 1 indicates an unwinding shaft, the reference signs 2b and 2c indicate the continuous label bodies before the waste peel-off is performed, the reference sign 4 indicates the label pieces, the reference sign 7 indicates the separator along which the labels are removably attached at spaced intervals as an illustrated embodiment, the reference signs 9b and 9c indicate the label wastes, and the reference sign 10 indicates the continuous label body. The reference sign 12 indicates the adhesive layer, the reference sign 13 indicates the base sheet, the reference signs 14, 14a, 14b, and 14c indicate the cured portions, and the reference sign 15 indicates a half-cut line. The reference sign 21 in FIG. 3A indicates the continuous adhesive sheet in a state in which the adhesive 12 is applied on the base sheet 13, and the separator 7 is attached to the adhesive 12, the reference sign 22 in FIG. 3B indicates the continuous adhesive sheet with the separator 7 peeled off, the reference signs 23b in FIG. 3C and 23c indicate the continuous adhesive sheet that is partially cured, and the reference signs 24b in FIG. 3D and 24c indicate the continuous adhesive sheet that is attached to the separator 7 once again. The reference sign 32 indicates an accumulator, the reference signs 33 and 34 indicate guide rollers. The reference sign 41 indicates a printing unit, the reference sign 42 indicates a plate cylinder, the reference sign 43 indicates an impression cylinder, the reference sign 44 indicates a UV lamp, the reference sign 51 indicates a printing unit, the reference sign 52 indicates a plate cylinder, the reference sign 53 indicates an impression cylinder, and the reference sign 54 indicates a UV lamp, the reference sign 61 indicates a printing unit, the reference sign 62 indicates a plate cylinder, the reference sign 63 indicates an impression cylinder, and the reference sign 64 indicates a UV lamp, the reference sign 71 indicates a printing unit, the reference sign 72 indicates a plate cylinder, the reference sign 73 indicates an impression cylinder, and the reference sign 74 indicates a UV lamp. The reference sign 81 indicates a die roll which is a roll with cutting blades, the reference sign 82 indicates an anvil roll, the reference signs 83 and 84 indicate waste peel-off rolls. The reference sign 91 indicates a winding-up shaft, the reference sign 96 indicates a waste winding-up shaft, and the reference sign 120 indicates an inspection area. The reference signs N1 and N2 indicate nip rollers, and the reference sign R indicates conveyance rollers.

The continuous label body 10 is processed as follows. The continuous adhesive sheet 21 is fed out from the unwinding shaft 1. The continuous adhesive sheet 21 is produced by applying the adhesive 12 onto the base sheet 13, and then attaching the separator 7 onto the adhesive 12 (FIG. 3A). The separator 7 is a general separator. Examples of this separator include paper or a film on which ultraviolet-ray curable silicone, thermosetting silicone, solvent silicone, alkyl pendant polymer, or fluorine-based lubricant is applied.

Next, the continuous adhesive sheet 21 is fed to a back surface printing step 40. The continuous adhesive sheet 21 is conveyed while being nipped between the plate cylinder 42 and the impression cylinder 43, and an ultraviolet-ray curable ink (ink instantly cured by irradiation of an ultraviolet ray) is fed from the printing unit 41 to the plate cylinder 42 so as to print the ink onto the continuous adhesive sheet 21. Then, the printed ink is cured by irradiation of ultraviolet ray from the UV lamp 44, thereby printing a timing mark onto the separator 7 side of the continuous adhesive sheet 21.

Figure 3B:
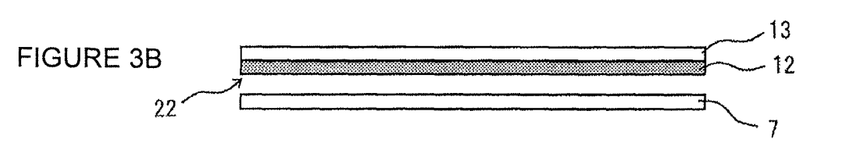
Figure 3C:
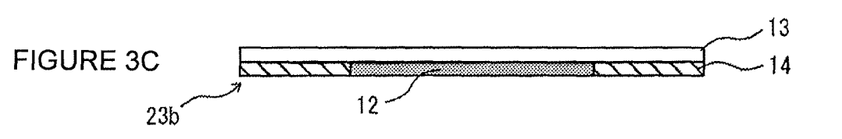
Figure 4:
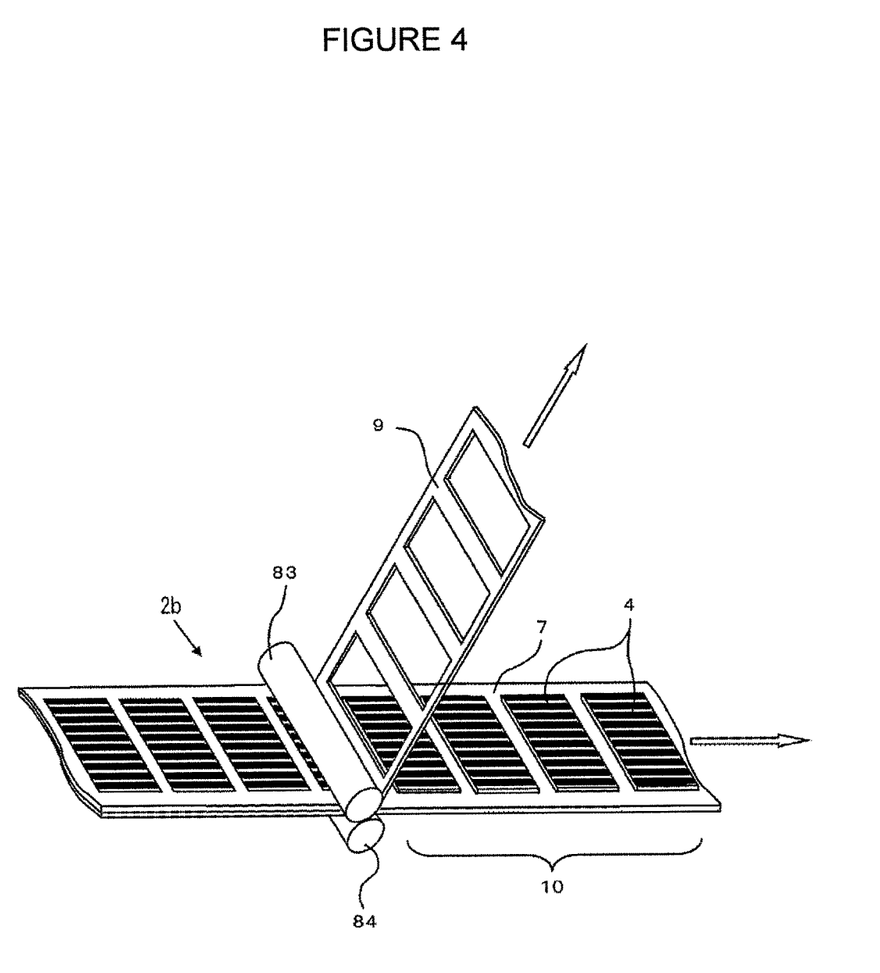
FIG. 4 is a perspective view showing the waste peel-off.
Figure 5A:
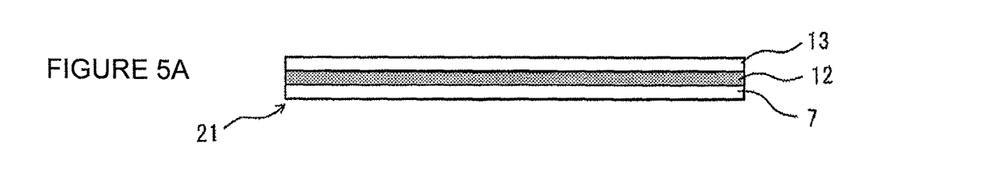
FIGS. 5A-5F are is a cross sectional views showing a continuous adhesive sheet and a continuous label body according to a second embodiment.
Figure 5B:
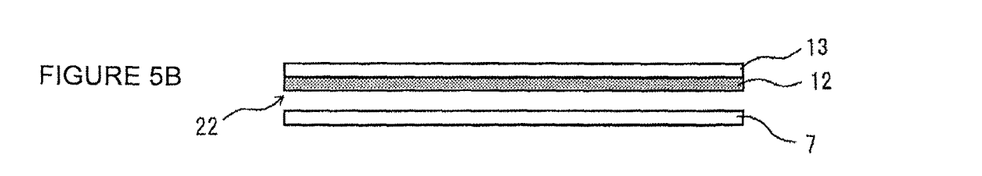
Figure 5C:
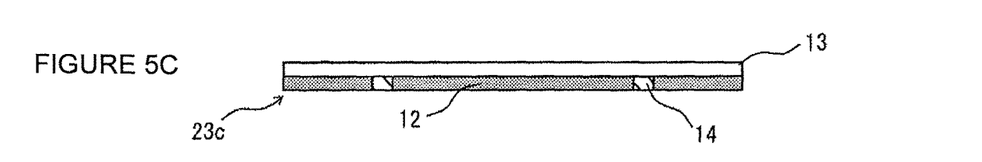
Figure 5D:
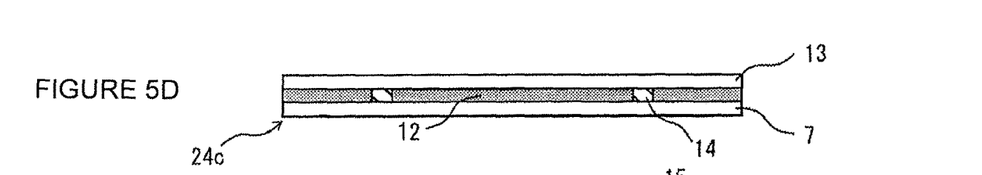
Figure 5E:
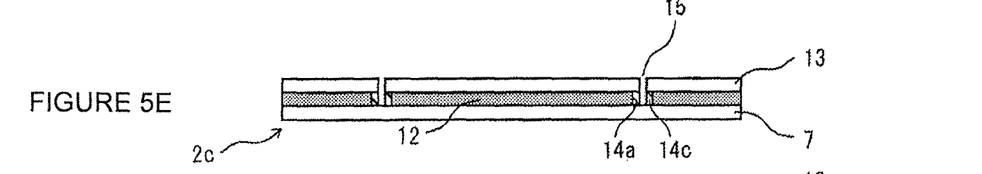
Figure 5F:
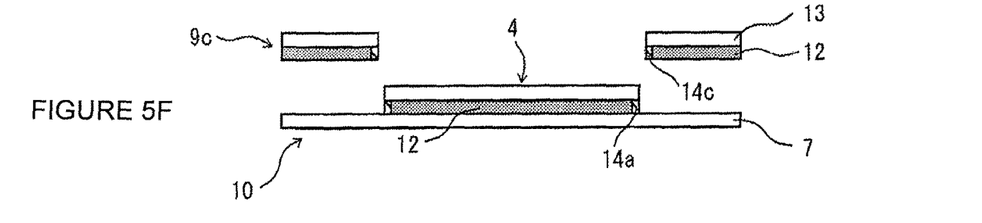

Subsequently, the continuous adhesive sheet 21 is separated into the continuous adhesive sheet 22 and the separator 7 with the nip rollers N1 (FIG. 3B). The continuous adhesive sheet 22 is conveyed while being nipped between the plate cylinder 52 and the impression cylinder 53, and the acrylate-based bonding adhesive is fed from the printing unit 51 to the plate cylinder 52 so as to apply the acrylate-based bonding adhesive to a predetermined portion of the adhesive layer 14 of the continuous adhesive sheet 21. At this time, the acrylate-based bonding adhesive and the adhesive are mixed. Then, the acrylate-based bonding adhesive and the adhesive are cured by irradiation of ultraviolet ray from the UV lamp 54, thereby producing the continuous adhesive sheet 23b in which the cured portion 14 is formed (FIG. 3C).

Figure 3D:
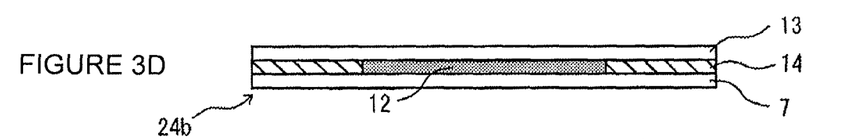

Meanwhile, the separator 7 separated by the nip rollers N1 is guided by the guide rollers 33, 34 via the accumulator 32 to go in a roundabout way, and is then attached to the continuous adhesive sheet 23b by the nip rollers N2. Accordingly, the continuous adhesive sheet 24b is produced in this manner (FIG. 3D).

The continuous adhesive sheet 24b provided with the cured portion 14 in this manner is fed downstream to the printing step and the printing is carried out on the front and back surfaces of the continuous adhesive sheet 24b through the printing unit 61, the plate cylinder 62, the impression cylinder 63, the UV lamp 64, the printing unit 71, the plate cylinder 72, the impression cylinder 73, the UV lamp 74, and others if necessary.

Figure 3E:
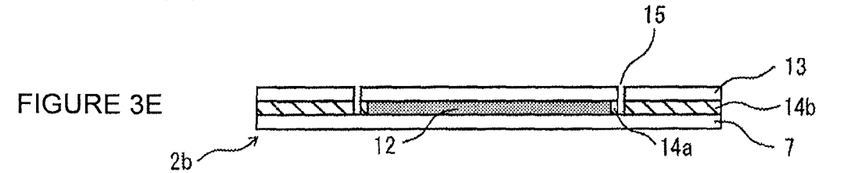

The continuous adhesive sheet 24b is then subjected to half-cutting with the die roll 81. The half-cut is made through the base sheet 13 into the cured portion. The half-cut line 15 is formed in such a manner, for example, that the continuous adhesive sheet 24b is nipped between a roll having blades, which is referred to as the die roll 81, and the anvil roll 82, and the die roll 81 is rotated while the die roll 81 is being pushed against the base sheet 13. At this time, the cutting blades cut the cured portion 14, thereby attaining secure cutting. The continuous adhesive sheet 24b subjected to the half-cutting becomes the continuous label body 2b before the waste peel-off (FIG. 3E).

Figure 3F:
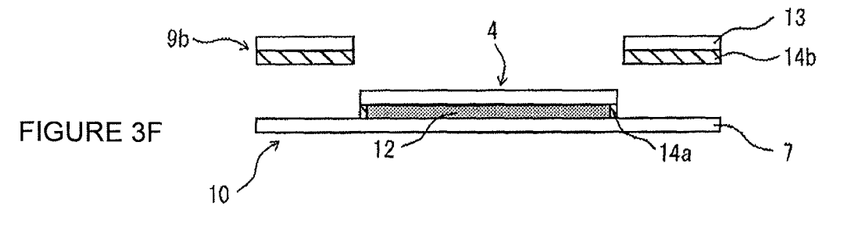

A pair of the waste peel-off rolls 83, 84 for separating the label waste 9b from the continuous label body 2b is disposed downstream of the die roll 81. The label waste 9b is peeled off by the waste peel-off roll 83 (FIG. 3F). The peeled-off label waste 9b is wound up around the waste winding-up shaft 96. The finished continuous label body 10 is conveyed through the guide roller R, and is wound up around the winding-up shaft 91.

As shown in FIG. 4, the continuous label body 2b is finished into the continuous label body 10 having the label pieces 4 arranged with constant intervals on the separator 7. Additionally, the label waste 9b is peeled-off by the waste peel-off roll 83. Each label piece 4 is securely cut by the half-cut line, thereby preventing the label lift-up.

It should be noted that in order to peel off the label piece 4 from the continuous label body 10 of the present invention, and to attach this label piece onto a target object, it is possible to easily peel off the label piece from the separator 7 by simply holding an edge of this label piece 4.

Next, the second embodiment is described with reference to FIGS. 5A-5F, which are cross sectional views showing the continuous adhesive sheet and the continuous label body according to the second embodiment. In the second embodiment as shown in FIGS. 5C to 5F, the cured portion 14 is formed only on the half-cut line 15 and in the vicinity of the half-cut line 15, which is different from the first embodiment. This configuration is feasible by adjusting a portion to which the acrylate-based bonding adhesive is applied, and a portion which is irradiated with the ultraviolet ray. In the second embodiment, it is possible to attain resource saving and energy saving effect by minimizing a processing region.

It should be appreciated that the present invention is not limited to the aforementioned embodiments, and that various modifications can be appropriately made in each embodiment without departing from the spirit and scope of the present invention. Moreover, the number, position, shape, and layout, etc., of each aforementioned component is not limited to those in the above embodiments, and the number, position, shape, and layout etc., thereof may be preferably adjusted for carrying out the present invention.

EXAMPLES

Examples of the present invention is described in detail, hereinafter. The present inventors have conducted the following tests.

Example 1

The base sheets (commercially available film base material made of polyethylene terephthalate, having a size of 85 mm×85 mm, and a thickness of 75 μm) were prepared. The adhesive (commercially available strong adhesive for rough surface, having adhesive force of 9800 mN/25 mm or more; Note that the adhesive force was measured in accordance with JIS Z-1538 and 0237) was applied with a brush on each base sheet to have a thickness of 20 μm, and was then dried so as to form the adhesive layer thereon. A radical-polymerizable acrylate-based bonding adhesive ("Aron Alpha (R)" which is a trade name manufactured by Toagosei Co., Ltd.) was applied with a brush onto a frame-like portion within 10 mm from a periphery of the adhesive layer, thereby forming the cured portion. The separator (commercially available release film having a size of 85 mm×85 mm, and a thickness of 75 μm) was then attached. Subsequently, the half-cutting was provided using a commercially available cutter onto the frame-like portion within 8 mm from the periphery of the base sheet such that the base sheet and the cured portion were cut together from the base sheet side. The portion outward of the cut line was peeled off as a waste, thereby producing the label piece. The label of Example 1 was produced in this manner.

Example 2

The radical-polymerizable acrylate-based bonding adhesive ("Aron Alpha (R)" which is a trade name manufactured by Toagosei Co., Ltd.) was applied with a brush onto a portion of 6 mm or more to 10 mm or less from the periphery of the adhesive layer (frame-like portion excluding the outer peripheral portion) so as to form the cured portion. Each label of Example 2 was produced based on the conditions similar to those in Example 1 other than the above conditions.

Comparative Example 1

Varnish ("UV Release OP Varnish" which is a trade name manufactured by T&K TOKA Corporation) was used instead of using the radical-polymerizable acrylate-based bonding adhesive. An ultraviolet ray was used to cure the varnish. Each label of Comparative Example 1 was produced based on the conditions similar to those in Example 1 other than the above conditions.

Major conditions of Examples and Comparative Example are shown in Table 1.

TABLE 1

| | Cured Portion |
|---|---|
| Example 1 | 10 mm from Periphery Using Bonding Adhesive |
| Example 2 | 6 mm to 10 mm from Periphery Using Bonding Adhesive |
| Comparative Example 1 | 10 mm from Periphery Using Varnish |

(Evaluation) <Label Lift-Up>An examination was conducted on occurrence of the label lift-up by peeling off the waste by hand for each label of Examples and Comparative Example.

<Adhesive Adhering to Cutting Blade>Visual observation was conducted on existence of the adhesive adhering to the cutting blade after ten sheets were consecutively cut in each label of Examples and Comparative Example.

<Adhesive Oozing-Out>Each label of Examples and Comparative Example was left for ten days at a room temperature in normal humidity, and an examination was conducted on occurrence of the oozing-out of the adhesive from the periphery of each label.

<Used Amount of Bonding Adhesive>The used amount of the bonding adhesive in each label was compared between Examples and Comparative Example.

TABLE 2

| | Label Lift-up | Adhesive Adhering to Cutting Blade | Adhesive Oozing-out | Used Amount of Bonding Adhesive |
|---|---|---|---|---|
| Example 1 | No | No | No | Large |
| Example 2 | No | No | No | Small |
| Comparative Example 1 | Yes | Yes | Yes | Large |

As is apparent from Table 2, Example 1 and Example 2 both yielded preferable results in terms of the label lift-up, the adhesive adhering to the cutting blade, and the adhesive oozing-out. Example 2 yielded a more preferable result in terms of the used amount of the bonding adhesive. To the contrary, in Comparative Example 1, there were practical problems in each of the label lift-up, the adhesive adhering to the cutting blade, and the adhesive oozing out.

As described above, according to the present invention, it is possible to provide a label manufacturing method and a label capable of securely cutting the adhesive and preventing the label lift-up. It is also possible to provide a label manufacturing method and a label capable of preventing the adhesive from adhering onto the cutting blades and also preventing the adhesive from oozing out from the edge of the label.

REFERENCE SIGNS LIST

1 Unwinding shaft
2b, 2c Continuous label body before waste peel-off
4 Label piece
7 Separator
8 Missing part
9, 9b, 9c Label waste
10 Continuous label body
12 Adhesive layer
13 Base sheet
14, 14a, 14b, 14c Cured portion
15 Half-cut line
21, 22, 23b, 23c, 24b, 24c Continuous adhesive sheet
32 Accumulator
33, 34 Guide roller
41, 51, 61, 71 Printing unit
42, 52, 62, 72 Plate cylinder
43, 53, 63, 73 Impression cylinder
44, 54, 64, 74 UV lamp
81 Die roll
82 Anvil roll
83, 84 Waste peel-off roll
91 Winding-up shaft
96 Waste winding-up shaft
120 Inspection area
N Nip roller
R Conveyance roller

The invention claimed is:
1. A label manufacturing method comprising:
applying a first adhesive to a base sheet to form an adhesive layer;
partially applying a second adhesive which is an acrylate-based bonding adhesive to the applied first adhesive layer, on the same side of the base sheet as the first adhesive layer;
irradiating the first adhesive and the partially applied acrylate-based bonding adhesive applied to the first adhesive layer with an ultraviolet ray such that only the acrylate-based bonding adhesive is cured; and cutting the base sheet where the acrylate-based bonding adhesive has been applied to define a separated label.

2. The label manufacturing method according to claim 1, further comprising:

peeling-off waste by removing an unnecessary portion of the base sheet outward of the separated label.

3. The label manufacturing method according to claim 1, wherein the acrylate-based bonding adhesive is a radical-polymerizable ultraviolet ray-curable composition.

4. The label manufacturing method according to claim 1, wherein the first and second adhesives are different adhesives.

5. The label manufacturing method according to claim 1, wherein the first adhesive is an adhesive based on synthetic rubber or natural rubber.

6. The label manufacturing method according to claim 1, further including:

attaching a label separator to the adhesive layer, wherein the separated label is removably attached to the label separator.

7. A label manufacturing method comprising:

applying a first adhesive to a base sheet to form an adhesive layer;

separating a separator layer from the adhesive layer;

partially applying a second adhesive which is an acrylate-based bonding adhesive to the applied adhesive layer, on the same side of the base sheet as the adhesive layer;

irradiating the acrylate-based bonding adhesive applied to the adhesive layer with an ultraviolet ray;

adding the separator layer; and cutting the base sheet where the acrylate-based bonding adhesive has been applied to define a separated label.

8. The label manufacturing method according to claim 7, further comprising:

peeling-off waste by removing an unnecessary portion of the base sheet outward of the separated label.

9. The label manufacturing method according to claim 7, wherein the acrylate-based bonding adhesive is a radical-polymerizable ultraviolet ray-curable composition.

10. The label manufacturing method according to claim 7, wherein the first and second adhesives are different adhesives.

11. The label manufacturing method according to claim 7, wherein the first adhesive is an adhesive based on synthetic rubber or natural rubber.

* * * * *